(12) United States Patent
Hayashi

(10) Patent No.: US 10,387,260 B2
(45) Date of Patent: Aug. 20, 2019

(54) REBOOT SYSTEM AND REBOOT METHOD

(71) Applicant: Takuya Hayashi, Kanagawa (JP)

(72) Inventor: Takuya Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 256 days.

(21) Appl. No.: 15/353,875

(22) Filed: Nov. 17, 2016

(65) Prior Publication Data

US 2017/0153898 A1 Jun. 1, 2017

(30) Foreign Application Priority Data

Nov. 26, 2015 (JP) .................................. 2015-230932
Mar. 30, 2016 (JP) .................................. 2016-069015

(51) Int. Cl.
*G06F 1/32* (2019.01)
*G06F 11/14* (2006.01)
*G06F 1/3234* (2019.01)
*G06F 9/4401* (2018.01)

(52) U.S. Cl.
CPC ........ *G06F 11/1441* (2013.01); *G06F 1/3284* (2013.01); *G06F 11/1417* (2013.01); *G06F 9/442* (2013.01); *Y02D 10/159* (2018.01)

(58) Field of Classification Search
CPC .................................... G06F 1/26; G06F 1/00
See application file for complete search history.

(56) References Cited

U.S. PATENT DOCUMENTS

| | | | | |
|---|---|---|---|---|
| 6,741,978 B1 * | 5/2004 | Rhoads | .................... | G06F 9/441 |
| 2005/0179931 A1 | 8/2005 | Yamaguchi et al. | | |
| 2008/0010506 A1 * | 1/2008 | Tabei | .................... | G06F 11/0724 |
| | | | | 714/6.12 |
| 2008/0151127 A1 * | 6/2008 | Ryou | ...................... | H04N 7/163 |
| | | | | 348/739 |
| 2010/0162030 A1 * | 6/2010 | Schindel, Jr. | ............ | G07F 19/20 |
| | | | | 714/3 |
| 2011/0185288 A1 * | 7/2011 | Gupta | .................... | G06Q 10/10 |
| | | | | 715/752 |
| 2017/0147440 A1 * | 5/2017 | Chang | ........................ | G06F 1/28 |

FOREIGN PATENT DOCUMENTS

| | | |
|---|---|---|
| JP | 2005-219247 | 8/2005 |
| JP | 2008-131603 | 6/2008 |
| JP | 2015-049731 | 3/2015 |

* cited by examiner

*Primary Examiner* — Jaweed A Abbaszadeh
*Assistant Examiner* — Keshab R Pandey
(74) *Attorney, Agent, or Firm* — Harness, Dickey & Pierce, P.L.C.

(57) ABSTRACT

A reboot system includes a control panel for operating an apparatus including a control panel controller, a main controller that communicates with the control panel controller of the control panel to control the apparatus, and a sub-controller that controls a power supply of the apparatus. The control panel controller monitors communication between the main controller and the control panel controller to detect a communication failure, and notifies the sub-controller of the communication failure between the main controller and the control panel controller. The sub-controller requests the power supply to reboot when the notification from the control panel controller indicating the communication failure is received.

16 Claims, 15 Drawing Sheets

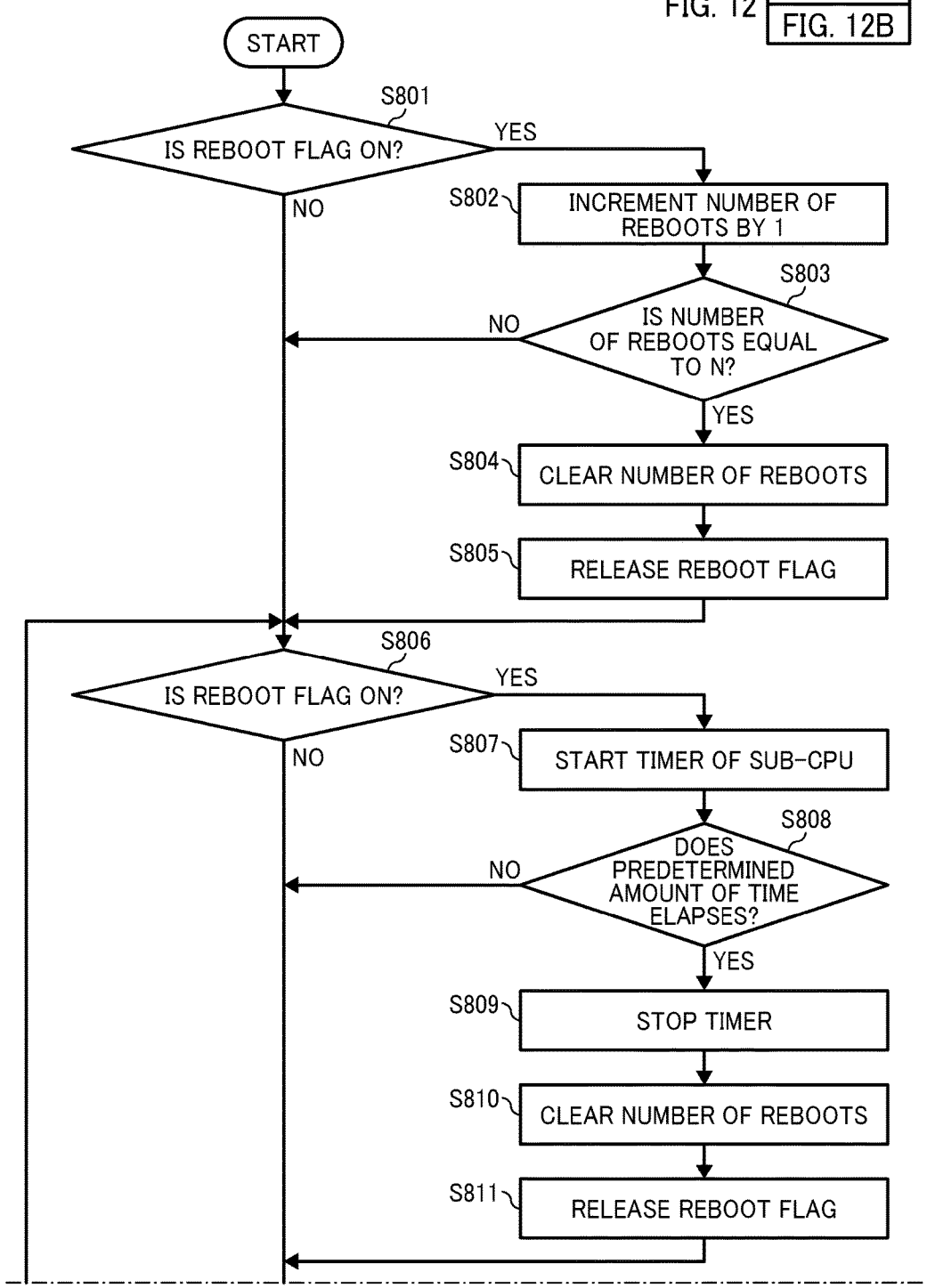

REBOOT SYSTEM AND REBOOT METHOD

CROSS-REFERENCE TO RELATED APPLICATION

This patent application is based on and claims priority pursuant to 35 U.S.C. § 119(a) to Japanese Patent Applications No. 2015-230932, filed on Nov. 26, 2015 and No. 2016-069015, filed on Mar. 30, 2016 in the Japan Patent Office, the entire disclosure of which is hereby incorporated by reference herein.

BACKGROUND

Technical Field

The present invention relates to a reboot system and a reboot method.

Background Art

The apparatuses such as image forming apparatuses regularly check a connection between a controller board for controlling the apparatus and a control panel of the controller board. In checking the connection, an error message is displayed on the control panel whenever the communication between the control panel and a central processing unit (CPU) in the controller board that regularly communicate with each other is shut down.

In that case, a recovery operation for connecting communication is performed. Conventionally, a power source is turned off and turned on by user operation, or the controller board and peripheral parts are replaced by a service person. This results in increase on user labor or service cost.

To reduce user labor, there has been a system that detects a malfunction required to reboot an apparatus, from among malfunctions that are likely to be recovered by turning off power and turning on power, and reboots a hardware resource and program. When such malfunction is detected, the system automatically reboots to perform the recovery operation.

SUMMARY

Example embodiments of the present invention provide a novel reboot system that includes a control panel for operating an apparatus including a control panel controller, a main controller that communicates with the control panel controller of the control panel to control the apparatus, and a sub-controller that controls a power supply of the apparatus. The control panel controller monitors communication between the main controller and the control panel controller to detect a communication failure, and notifies the sub-controller of the communication failure between the main controller and the control panel controller. The sub-controller requests the power supply to reboot when the notification from the control panel controller indicating the communication failure is received.

Further example embodiments of the present invention provide a reboot method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 12A and 12B are flowcharts illustrating a fourth operation of rebooting automatically in the reboot system as an embodiment of the present invention;

Figure 1:
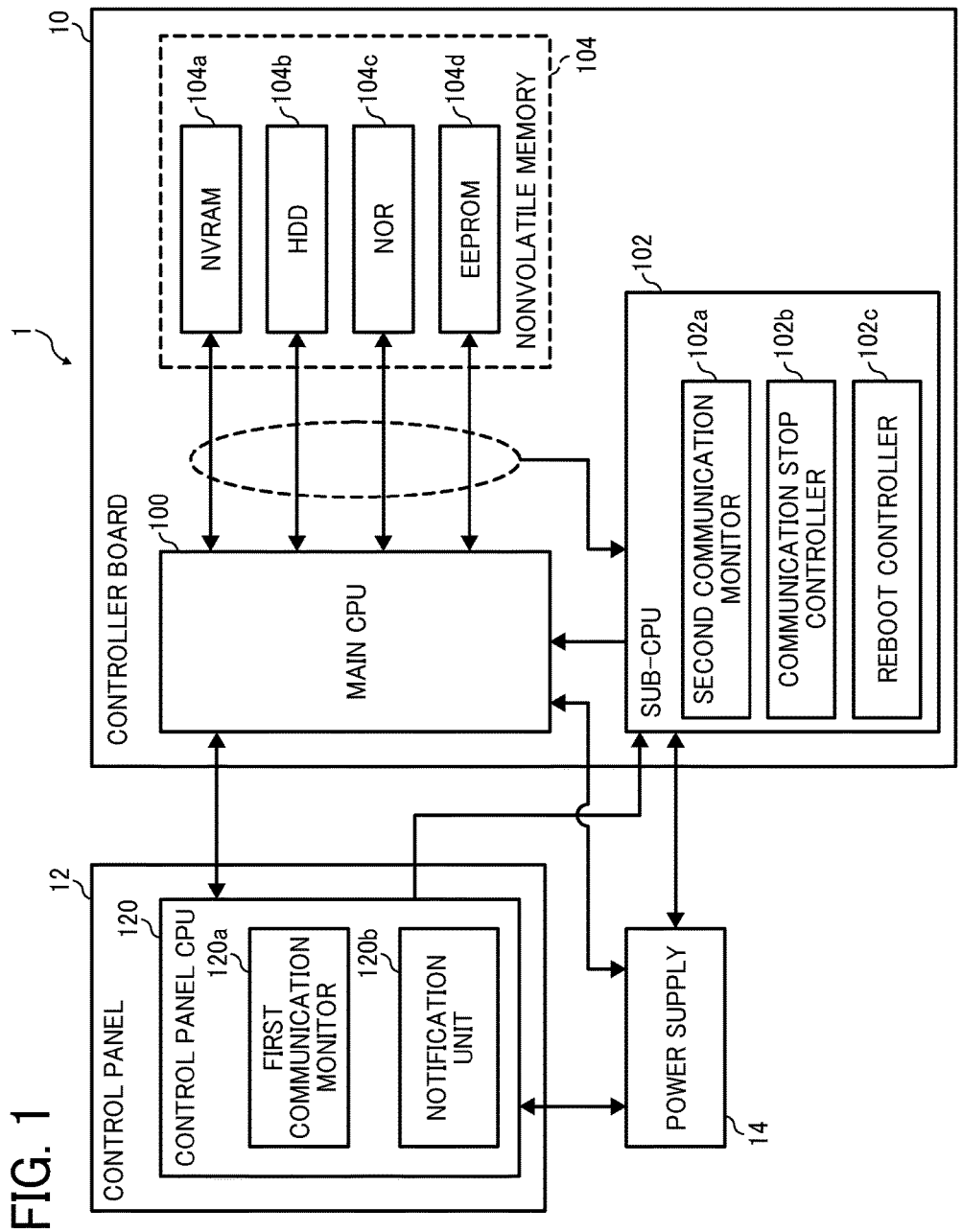
FIG. 1 is a block diagram illustrating a configuration of a reboot system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the embodiments of the present invention, a sub-CPU is separately provided from a main CPU in a controller (control circuit), which communicates with a control panel via a communication interface (I/F). Here, the main CPU regularly communicates with the control panel. However, if the main CPU stops operating from any cause, the main CPU stops responding to the regular communication. In this case, after detecting that there is no response from the main CPU, the control panel transfers a notification to the sub-CPU. After receiving the notification from the control panel, the sub-CPU automatically requests a power supply to reboot. After requesting to reboot, the power supply is turned off and turned on (i.e., the status of the power supply transitions from power-on, power-off, to power-on), and the system is rebooted.

Embodiments of the reboot system in the present invention are described below with reference to figures.

First Embodiment

FIG. 1 is a block diagram illustrating a configuration of a reboot system in this embodiment. In this embodiment, it is assumed that the reboot system of FIG. 1 is provided for an image forming apparatus.

In this embodiment, as illustrated in FIG. 1, a reboot system 1 includes a controller board 10, a control panel 12, and a power supply 14 as a power source.

The controller board 10 includes a main CPU 100 as a main controller and a sub-CPU 102 as a sub-controller. The control panel 12 includes a control panel CPU 120 as a control panel controller.

The power supply 14 is connected to the main CPU 100 and the sub-CPU 102 on the controller board 10, and the control panel CPU 120, respectively, via power supply lines, to supply power to the controller board 10 and the control panel 12. With this configuration, the controller board 10 (i.e., the main CPU 100 and the sub-CPU 102) is able to instruct the power supply 14 to supply power to devices in the image forming apparatus. The main CPU 100 controls the entire apparatus through communication with the control panel CPU 120.

The controller board 10 and the control panel 12 are connected, by the main CPU 100 and the control panel CPU 120, to communicate with each other at a predetermined interval and constantly check the mutual connection. The control panel CPU 120 is connected to the sub-CPU 102 to report a communication failure between the control panel 12 and the controller board 10.

In this case, the CPU 120 in the control panel 12 monitors communication between the control panel CPU 120 and the main CPU 100. The control panel CPU 120 operates as a first communication monitor 120a and a notification unit 120b. When detecting communication failure, the control panel CPU 120 notifies the sub-CPU 102 of the communication failure.

In addition, the main CPU 100 in the controller board 10 is connected to a nonvolatile memory 104. The sub-CPU 102 functions as a monitor (i.e., a second communication monitoring unit 102a) that monitors communication (connection) between the main CPU 100 and the nonvolatile memory 104.

Furthermore, the sub-CPU 102 functions as a communication stop controller 102b that requests the main CPU 100 to stop communication (i.e., connection) with the nonvolatile memory 104, and as a reboot controller 102c that requests the power supply 14 to be rebooted and control the power supply 14 to be turned off and turned on.

The functional units in the control panel CPU 120 and the sub-CPU 102 described above are implemented by a plurality of instructions to be read by one or more processors, such as the control panel CPU 120 and the sub-CPU 102.

As illustrated in FIG. 1, examples of the nonvolatile memory 104 are a non-volatile random access memory (NVRAM) 104a, a hard disk drive (HDD) 104b, a NOR-type flash memory 104c, and an electrically erasable programmable read-only memory (EEPROM) 104d etc.

Figure 2:
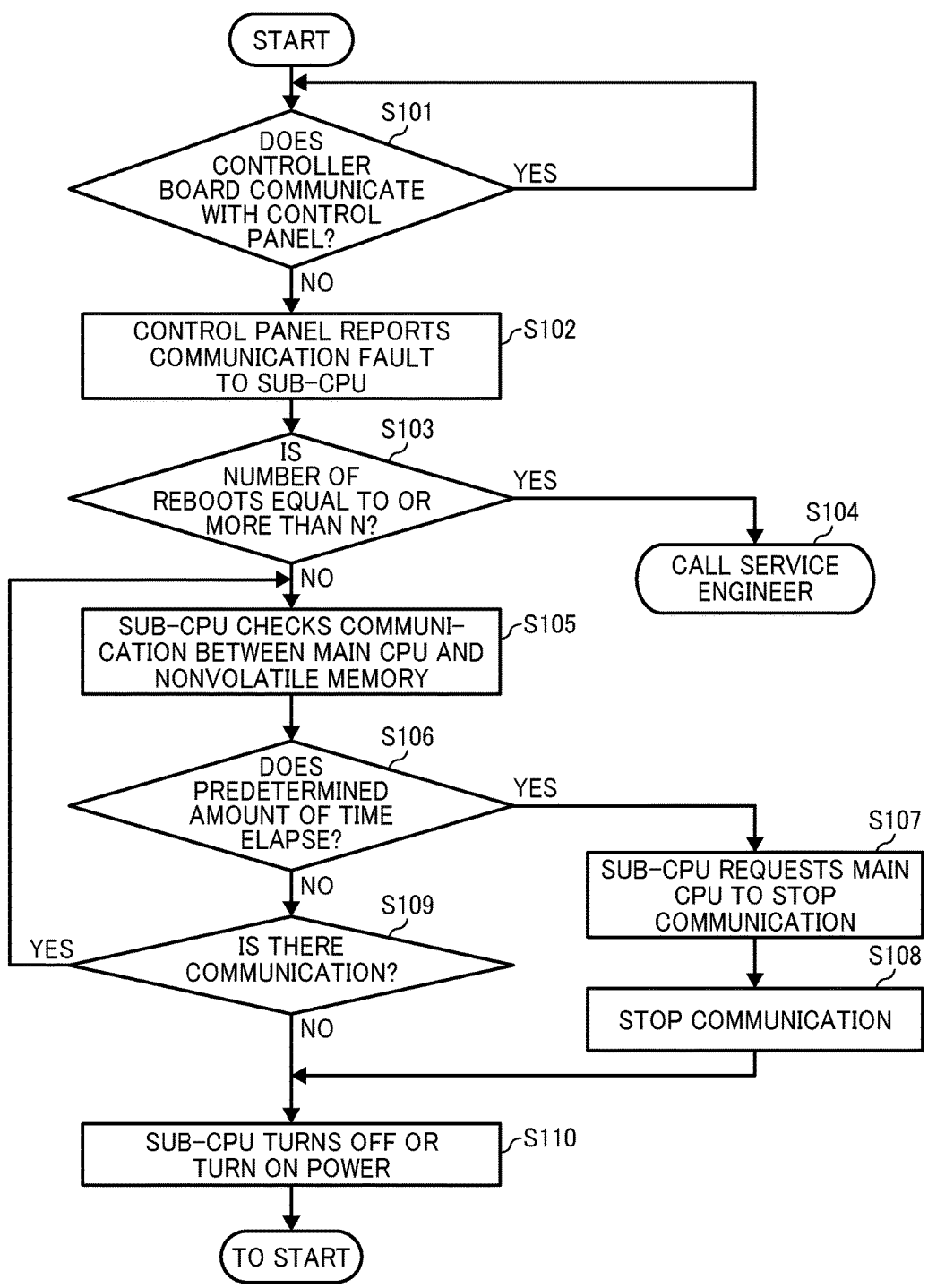
FIG. 2 is a flowchart illustrating operation of rebooting automatically in the reboot system of FIG. 1 as an embodiment of the present invention.

FIG. 2 is a flowchart illustrating an operation of rebooting automatically in the reboot system 1 of FIG. 1 as an embodiment of the present invention.

In the reboot system 1 in FIG. 1, after turning on the power supply 14, the main CPU 100 in the controller board 10 and the control panel CPU 120 communicates with each other at a predetermined interval in S101.

If there is no response from the main CPU 100 in response to a communication (access) from the control panel CPU 120, the first communication monitor 120a of the control panel CPU 120 determines that the communication failed (NO in S101). After determining that the communication failed, the notification unit 120b of the control panel CPU 120 reports to the sub-CPU 102 in the controller board 10 that the communication failed in S102.

Subsequent operations vary depending on the number of reboots.

The sub-CPU 102 counts and records the number of reboots. If the number of reboots is equal to or more than a predetermined number of times (N times) (YES in S103), the sub-CPU 102 does not request to reboot, and sends an error message to the control panel 12 (more specifically, a serviceperson call message is displayed on the control panel 12) in S104, and the operation ends. This prevents the system from repeating reboots even when an error cannot be fixed.

By contrast, if the number of reboots is less than the predetermined number of times (NO in S103), the second communication monitor 102a of the sub-CPU 102 checks whether or not there is a communication between the main CPU 100 and the nonvolatile memory 104 in S105.

In S105, the sub-CPU 102 checks communication at a predetermine period of time. If it is confirmed that there is no communication between the main CPU 100 and the nonvolatile memory 104, the system 1 is rebooted and the operation starts again.

More specifically, for example, a predetermined period of time is set to restrict a time period during when the sub-CPU 102 checks the communication between the main CPU 100 and the nonvolatile memory 104 in S106. Within the predetermined period of time (NO in S106), if it is determined that there is no communication (NO in S109), the reboot controller 102c of the sub-CPU 102 requests the power supply 14 to be rebooted. The whole system is rebooted by turning the power supply off and on in S110, and the operation starts again.

Within the predetermined period of time (NO in S106), if it is determined that there is communication (YES in S109), the operation returns to S105, and the sub-CPU 102 waits until the predetermined period of time elapses. If the communication continues until the predetermined period of time elapses (YES in S106), the communication stop controller 102b of the sub-CPU 102 requests the main CPU 100 to stop communication in S107. In this case, the request to stop communication indicates to assert a reset signal to the main CPU 100 for example. As a result, the main CPU 100 stops communication with the nonvolatile memory 104 in S108. After stopping communication, the sub-CPU 102 turns the power supply 14 off and on in S110 to reboot the whole system, and the operation starts again.

Second Embodiment

In the first embodiment, if the communication between the main CPU 100 and the nonvolatile memory 104 continues for the predetermined period of time, the sub-CPU 100 requests the main CPU 100 to stop communication and the communication stops.

However, in this case, if the power supply 14 is turned off while the nonvolatile memory 104 is being accessed (under communication), that data in the nonvolatile memory 104 may be lost. To cope with this issue, in the second embodiment, if the communication between the main CPU 100 and the nonvolatile memory 104 continues (i.e., there is communication between the main CPU 100 and the nonvolatile memory 104), such that a control signal applied to the nonvolatile memory 104 (CS signal in this case) is asserted, the sub-CPU 102 requests the main CPU 100 to stop communication. Explanation in this embodiment is simplified to a degree, and other features are in common with the first embodiment.

Figure 3:
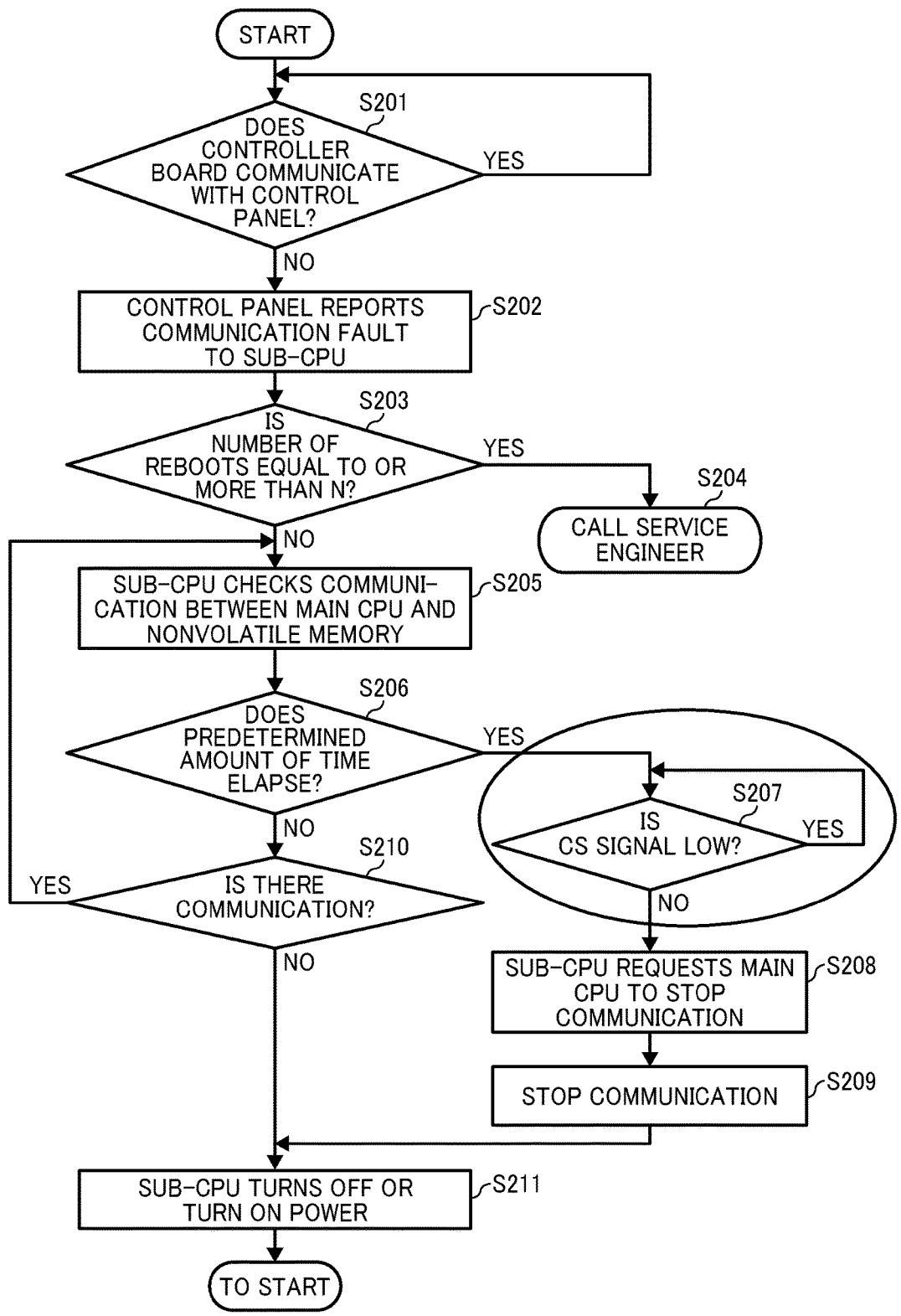
FIG. 3 is a flowchart illustrating an operation of rebooting automatically in the reboot system as an embodiment of the present invention.

FIG. 3 is a flowchart illustrating an operation of rebooting automatically in the reboot system in this embodiment.

After turning on the power supply 14, the main CPU 100 in the controller board 10 and the control panel CPU 120 communicate with each other at a predetermined interval. In this case, if there is no response from the main CPU 100 to the communication (access) from the control panel 12, the control panel CPU 120 determines that the communication failed (NO in S201). After determining that the communication failed, the control panel CPU 120 reports the sub-CPU 102 in the controller board 10 that the communication failed in S202.

Subsequent operations vary depending on the number of reboots.

The sub-CPU 102 counts and records the number of reboots. If the number of reboots is equal to or more than a predetermined number of times (N times) (YES in S203), the sub-CPU 102 does not request to reboot, and a serviceperson call message is displayed on the control panel 12 in S204, and the operation ends.

By contrast, if the number of reboots is less than the predetermined number of times (NO in S203), the sub-CPU 102 checks whether or not there is a communication between the main CPU 100 and the nonvolatile memory 104 in S205. In S205, the sub-CPU 102 checks communication at a predetermine period of time. If it is confirmed that there is no communication between the main CPU 100 and the nonvolatile memory 104, the entire system is rebooted and the operation starts again.

More specifically, for example, a predetermined period of time is set to restrict a time period during when the sub-CPU 102 checks the communication between the main CPU 100 and the nonvolatile memory 104 in S206. Within the predetermined period of time (NO in S206), if it is determined that there is no communication (NO in S210), the sub-CPU 102 requests the power supply 14 to be rebooted. The whole system is rebooted by turning the power supply off and on in S211, and the operation starts again.

Within the predetermined period of time (NO in S206), if it is determined that there is communication (YES in S210), the operation returns to S205, and the sub-CPU 102 waits until the predetermined period of time elapses. If the communication continues until the predetermined period of time elapses (YES in S206), the sub-CPU 102 further waits until a Chip Select (CS) signal of the main CPU 100 changes from low to high in S207. Subsequently, if the CS signal becomes high as illustrated in FIG. 4 (NO in S207), the sub-CPU 102 requests the main CPU 100 to stop communication in S208.

In this case, just like the first embodiment, the request to stop communication indicates to assert a reset signal to the main CPU 100 for example. As a result, the main CPU 100 stops operation in S209. After stopping communication, the sub-CPU 102 requests the power supply 14 to be rebooted. The sub-CPU 102 then turns the power supply 14 off and on in S110 to reboot the whole system in S211, and the operation starts again.

Figure 4:
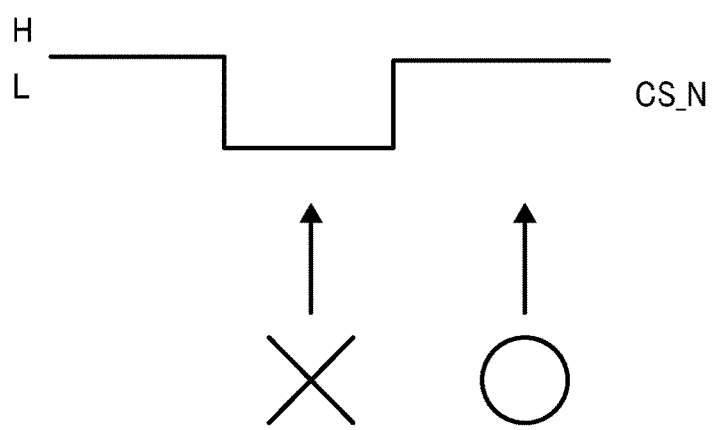
FIG. 4 is a diagram illustrating a waveform indicating a high level and a low level of a CS signal.

FIG. 4 is a diagram illustrating a waveform indicating a high level and a low level of the CS signal.

In the second embodiment, the sub-CPU 102 checks a CS signal before requesting the main CPU 100 to stop communication. In this case, while the CS signal of the main CPU 100 indicates low in FIG. 4, the sub-CPU 102 determines that the nonvolatile memory 104 is being accessed. As a result, after confirming that the CS signal (CS_N) is high, that is, under the condition in which the nonvolatile memory 104 is being accessed, the sub-CPU 102 requests to stop communication.

In FIG. 4, X symbol indicates a time when the request to stop communication is not issued, and O symbol indicates a time when the request to stop communication is issued.

The above-described system prevents the power supply 14 from turning off while the nonvolatile memory 104 is being accessed, thus securing data in the nonvolatile memory 104.

Third Embodiment

The third embodiment in the present invention is described below. The system according to the third embodiment is substantially similar to any one of the above-described systems of the first embodiment and the second embodiment, except for the following. That is, in the first embodiment and the second embodiment, the sub-CPU 100 requests the main CPU 100 to stop communication to stop the communication between the main CPU 100 and the nonvolatile memory 104. By contrast, in the third embodiment, the main CPU 100 is controlled to stop accessing the nonvolatile memory 104 by masking a CS signal transmitted from the main CPU 100 to the nonvolatile memory 104. That is, if the communication between the main CPU 100 and the nonvolatile memory 104 continues for a predetermined period of time, a CS signal masking unit in the sub-CPU 102 masks the CS signal to issue a request to stop the communication.

Figure 5:
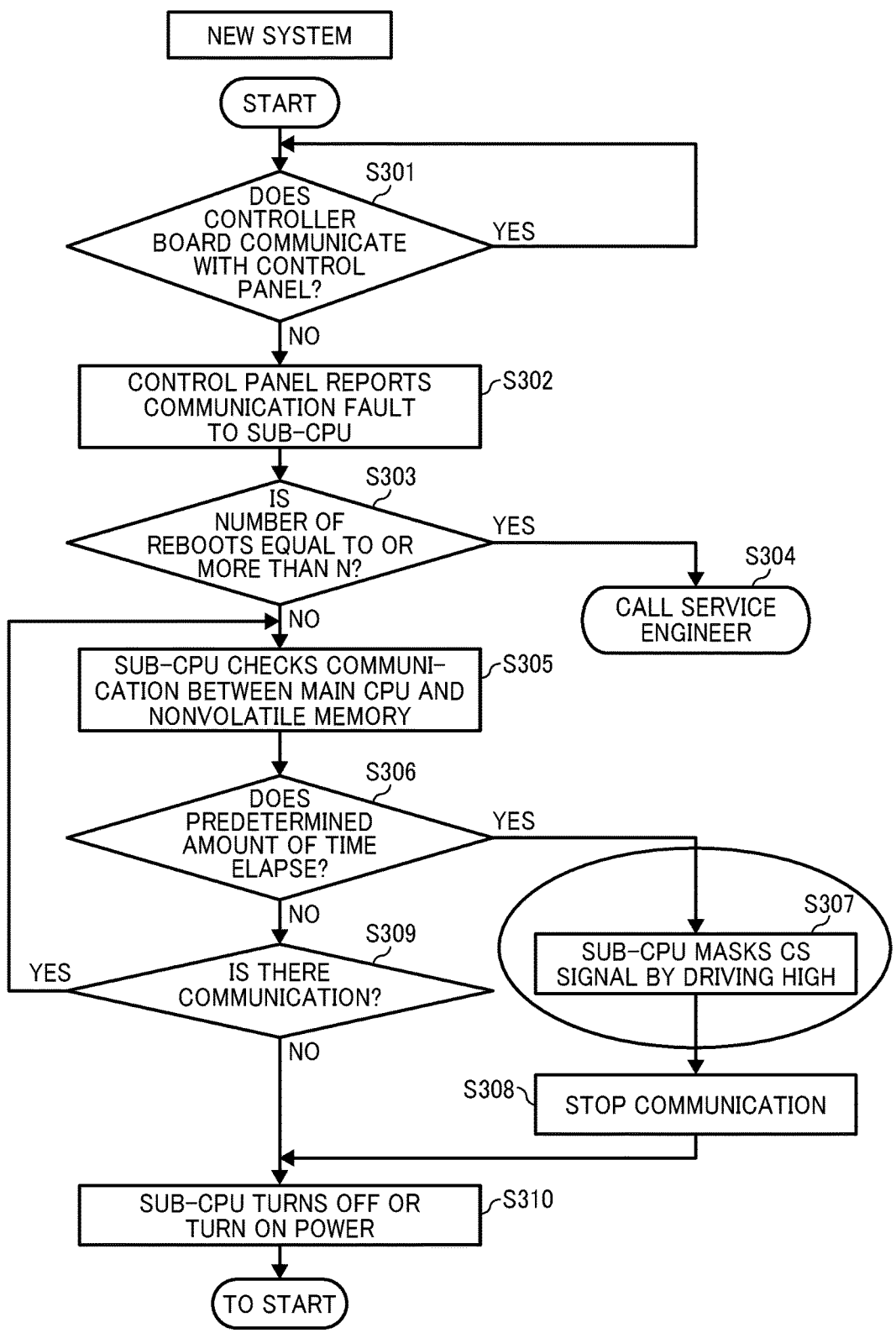
FIG. 5 is a flowchart illustrating an operation of rebooting automatically in the reboot system as an embodiment of the present invention.

FIG. 5 is a flowchart illustrating an operation of rebooting automatically in the reboot system in this embodiment.

If there is no response from the main CPU 100 to the communication from the control panel 12, the control panel CPU 120 determines that the communication failed (NO in S301). After determining that the communication failed, the control panel CPU 120 reports the sub-CPU 102 in the controller board 10 that the communication failed in S302.

Subsequent operations vary depending on the number of reboots.

The sub-CPU 102 counts and records the number of reboots. If the number of reboots is equal to or more than a predetermined number of times (N times) (YES in S303), the sub-CPU 102 does not request to reboot, and a serviceperson call message is displayed on the control panel 12 in S304, and the operation ends.

More specifically, in this embodiment, the sub-CPU 102 records the number of reboots of the power supply 14 due to the communication failure. If the number of reboots is equal to or more than a predetermined number of times (YES in S303), the system is not rebooted, and a serviceperson call message is displayed on the control panel 12 in S304.

If the number of reboots is less than the predetermined number of times (NO in S303), the sub-CPU 102 checks whether or not there is a communication between the main CPU 100 and the nonvolatile memory 104 in S305.

In S305, the sub-CPU 102 checks communication at a predetermine period of time. If it is confirmed that there is no communication between the main CPU 100 and the nonvolatile memory 104, the entire system is rebooted and the operation starts again.

More specifically, for example, a predetermined period of time is set to restrict a time period during when the sub-CPU 102 checks the communication between the main CPU 100 and the nonvolatile memory 104 in S306. Within the predetermined period of time (NO in S306), if it is confirmed that there is no communication (NO in S309), the sub-CPU 102 requests the power supply 14 to be rebooted. The whole system is rebooted by turning the power supply off and on in S310, and the operation starts again.

Within the predetermined period of time (NO in S306), if it is determined that there is communication (YES in S309), the operation returns to S305, and the sub-CPU 102 waits until the predetermined period of time elapses. If the communication continues until the predetermined period of time elapses (YES in S306), a control signal masking unit in the sub-CPU 102 masks the control signal (i.e., CS signal in this case) in S307. As a result, the communication between the main CPU 100 and the nonvolatile memory 104 stops in S308. After stopping communication, the sub-CPU 102 turns the power supply 14 off and on in S310 to reboot the whole system, and the operation starts again.

Figure 6:
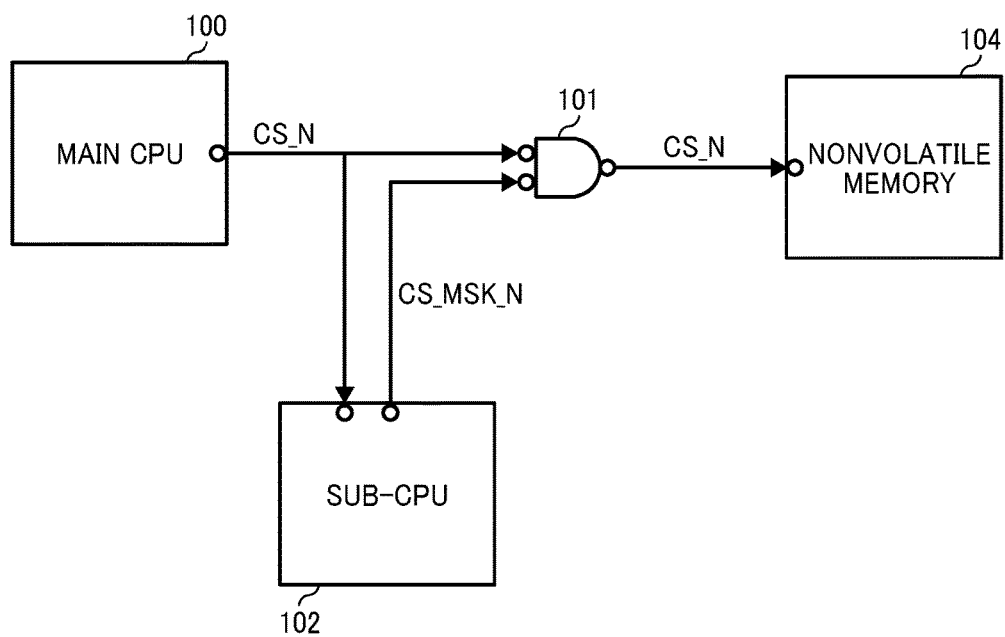
FIG. 6 is a block diagram illustrating a circuit configuration of a reboot system in which the sub-CPU masks a CS signal output from the main CPU.

FIG. 6 is a block diagram illustrating a circuit configuration of the system in which the sub-CPU 102 masks the CS signal of the main CPU 100.

In addition to the elements in the reboot system 1 in FIG. 1, the reboot system of this embodiment further includes an NAND circuit 101 between the main CPU 100 and the sub-CPU 102, and the nonvolatile memory 104.

In this case, after receiving the CS signal of the main CPU 100 and confirming that there is communication between the main CPU 100 and the nonvolatile memory 104, the sub-CPU 102 outputs a signal for masking CS signal (CS_MASK_N) to the NAND circuit 101. In this case, CS signal (CS_N) on the side of the nonvolatile memory 104 is controlled to become high regardless of the output of the main CPU 100 (i.e., it does not matter whether the output of the main CPU 100 is high or low) to stop access to the nonvolatile memory 104.

As described above, in the third embodiment, it is also possible to prevent that the power supply 14 from turning off while the nonvolatile memory 104 is being accessed and data in the nonvolatile memory 104 is secured.

Fourth Embodiment

First, the fourth embodiment in the present invention is schematically described below. In the fourth embodiment of the present invention, if there is communication failure between the controller board and the control panel, the system is automatically rebooted in response to a request to reboot to the power supply by the sub-CPU in the controller board. In rebooting automatically, the sub-CPU records a reboot history in the nonvolatile area. After rebooting automatically, it is not always true that the system surely becomes normal. To cope with this issue, the sub-CPU monitors elapsed time or the number of times of turning the power supply off and on by the sub-CPU, to set a period of time in which repeating of rebooting is prohibited.

Figure 7:
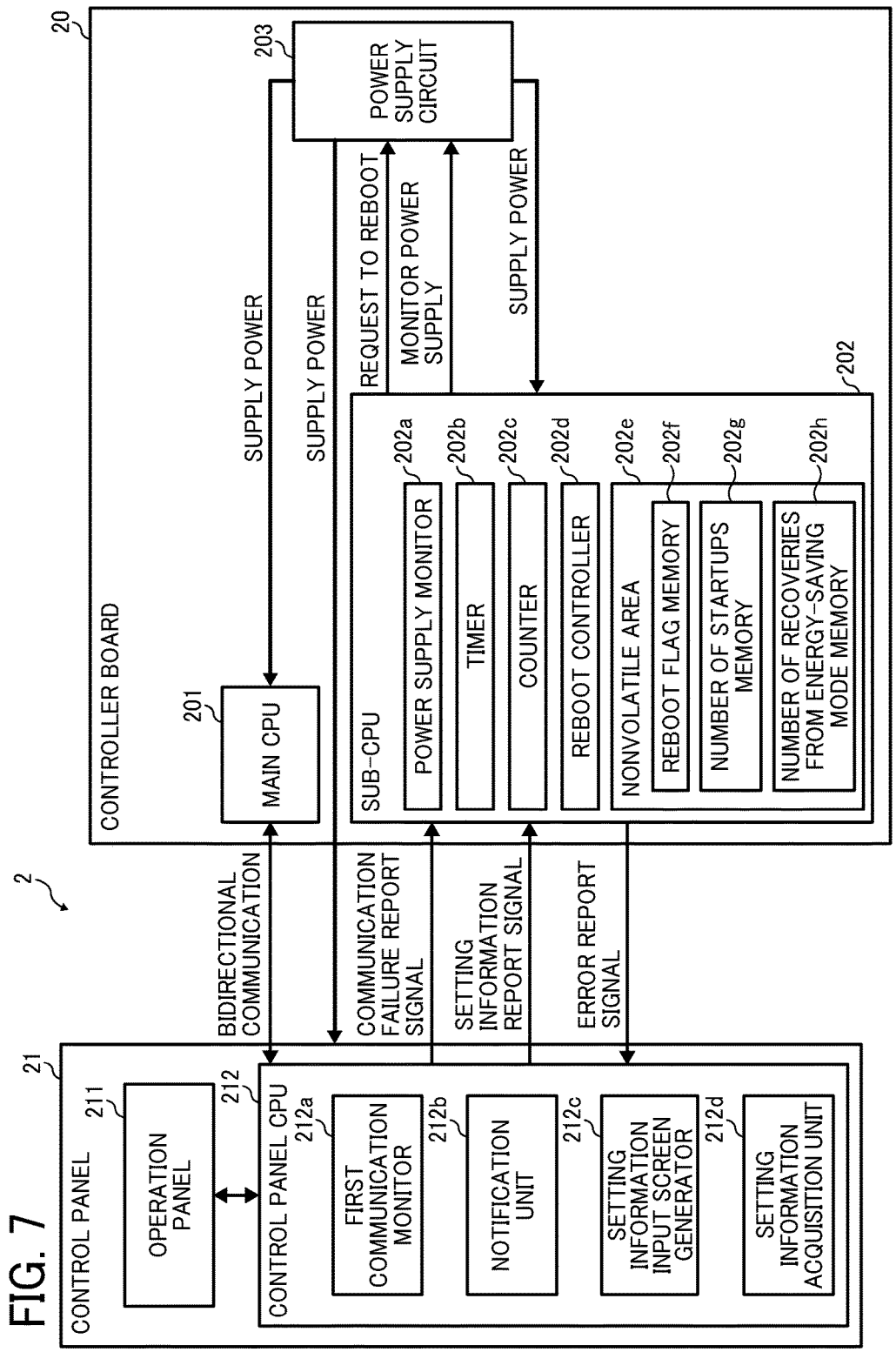
FIG. 7 is a block diagram illustrating a configuration of a reboot system as an embodiment of the present invention.

FIG. 7 is a block diagram illustrating a configuration of a reboot system in this embodiment.

In this embodiment, as illustrated in FIG. 7, a reboot system 2 includes a controller board 20 and a control panel 21. Just like the first embodiment (FIG. 1), the reboot system is also applied to the image forming apparatus for example.

The controller board 20 includes a main CPU 201 as a main controller, a sub-CPU 202 as a sub-controller, and a power supply circuit 203 as a power source. The control panel 21 includes an operation panel 211 as an operation display unit and a control panel CPU 212 as a control panel controller.

The power supply 203 is connected to the main CPU 201 and the sub-CPU 202 on the controller board 20 and the control panel CPU 212 in the control panel 21 respectively, via power supply lines, to supply power to the controller board 20 and the control panel 21. With this configuration, the controller board 20 (i.e., the main CPU 201 and the sub-CPU 202) is able to instruct the power supply circuit 203 to supply power to devices in the image forming apparatus. In addition, the main CPU 201 control the entire apparatus through communication with the control panel CPU 212.

The controller board 20 and the control panel 21 are connected, by the main CPU 201 and the control panel CPU 212, to communicate with each other at a predetermined interval and constantly check the mutual connection. The control panel CPU 212 is connected to the sub-CPU 202 to report a communication failure between the control panel 21 and the controller board 20.

In this case, the control panel CPU 212 in the control panel 21 functions as a first communication monitor 212*a*, a notification unit 212*b*, a setting information input screen generator 212*c*, and a setting information acquisition unit 212*d*.

Just like the first communication monitor 120*a* in the first embodiment, the first communication monitor 212*a* monitors communication between the control panel CPU 212 and the main CPU 201 to detect communication failure. After the first communication monitor 212*a* detects communication failure, the notification unit 212*b* reports the communication failure to the sub-CPU 202 (i.e., a communication failure reporting signal is transferred). In addition, the notification unit 212*b* sends setting information (described in detail later) acquired by the setting information acquisition unit 212*d* to the sub-CPU 202 (i.e., a setting information reporting signal is transferred).

The setting information input screen generator 212*c* generates an image for displaying a setting information input screen (described in detail later) on the operation panel 211. The setting information acquisition unit 212d acquires setting information input on the setting information input screen.

The sub-CPU 202 in the controller board 20 functions as a power supply monitor 202a, a timer 202b, a counter 202c, and a reboot controller 202d.

The power supply monitor 202a monitors a status of the power supply circuit 202 (such as turned on and turned off etc.). The timer 202b counts various periods of time (described specifically later). The counter 202c counts the number of occurrences for various events (described specifically later). The reboot controller 202d requests the power supply circuit 202 to be rebooted.

That is, the functional units in the control panel CPU 212 and the sub-CPU 202 described above are implemented by a plurality of instructions to be read by one or more processors, such as the control panel CPU 212 and the sub-CPU 202 respectively.

In addition, the sub-CPU 202 includes a nonvolatile area 202e constructed by the EEPROM etc. The nonvolatile area 202e includes a reboot flag memory 202f, a startup number ("number of startups") memory 202g, and a recovery number ("number of recoveries from energy-saving mode") memory 202h. The sub-CPU 202 controls the reboot flag memory 202f (such as turning on and off the flag etc.), controls a value stored in the startup number memory 202g (such as incrementing the value and clearing the value etc.), and controls a value stored in the recovery number memory 202h (such as incrementing the value and clearing the value etc.). Alternatively, a nonvolatile memory may be provided outside the sub-CPU 202, while providing the reboot flag memory 202f, the startup number memory 202g, and the recovery number memory 202h inside the sub-CPU 202.

In addition, after receiving a notification of communication failure from the control panel CPU 212, if the reboot flag is turned on, the sub CPU 202 transfers an error notification signal to the control panel CPU 212. The control panel CPU 212 displays error information (such as serviceperson call etc.) on the operation panel 211 based on the error notification signal.

Figure 8:
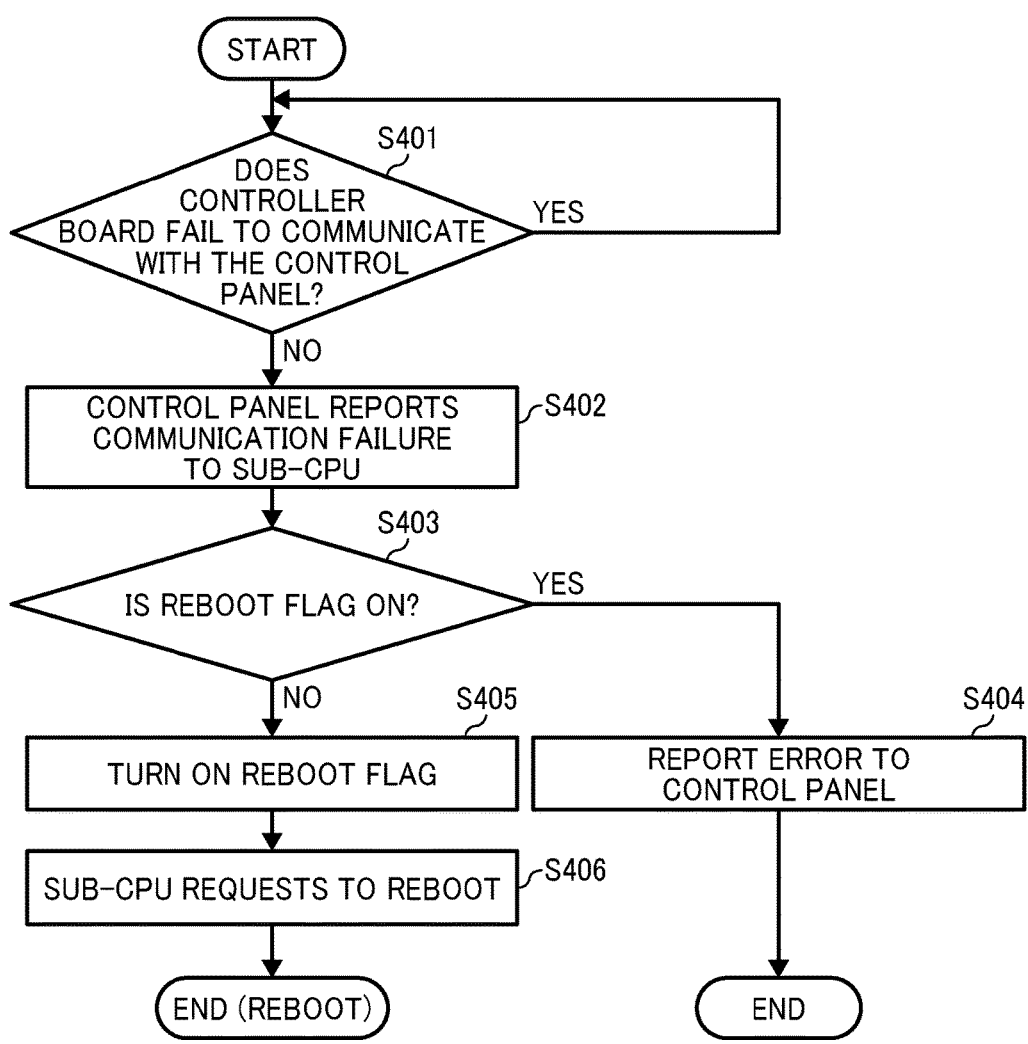
FIG. 8 is a flowchart illustrating a basic operation of rebooting automatically in the reboot system as an embodiment of the present invention.

FIG. 8 is a flowchart illustrating a basic operation of rebooting automatically in the reboot system in this embodiment.

As described before, the main CPU 201 in the controller board 20 communicates with the control panel CPU 212 at a predetermined interval. Subsequently, if there is no response from the main CPU 201 in response to the communication from the control panel CPU 212, the first communication monitor 212a in the control panel CPU 212 determines that communication failed (NO in S401). The notification unit 212b of the control panel CPU 212 reports to the sub-CPU 202 in the controller board that the communication failed in S402.

The reboot controller 202d in the sub-CPU 202 turns on the reboot flag when the system is rebooted due to the communication failure. If the reboot flag is turned on (YES in S403), the sub-CPU 202 transfers an error notification signal to the control panel CPU 212 in S404. The control panel CPU 212 displays a serviceperson call on the operation panel 211 based on the error notification signal. If the reboot flag is not turned on (NO in S403), the reboot flag in the reboot flag memory 202f in the nonvolatile area 202e is turned on (S405), and the power supply circuit 203 is requested to be rebooted in S406. After requesting to be rebooted, the power supply circuit 203 is turned off and on to reboot the system.

First Operation of Rebooting Automatically

Figure 9:
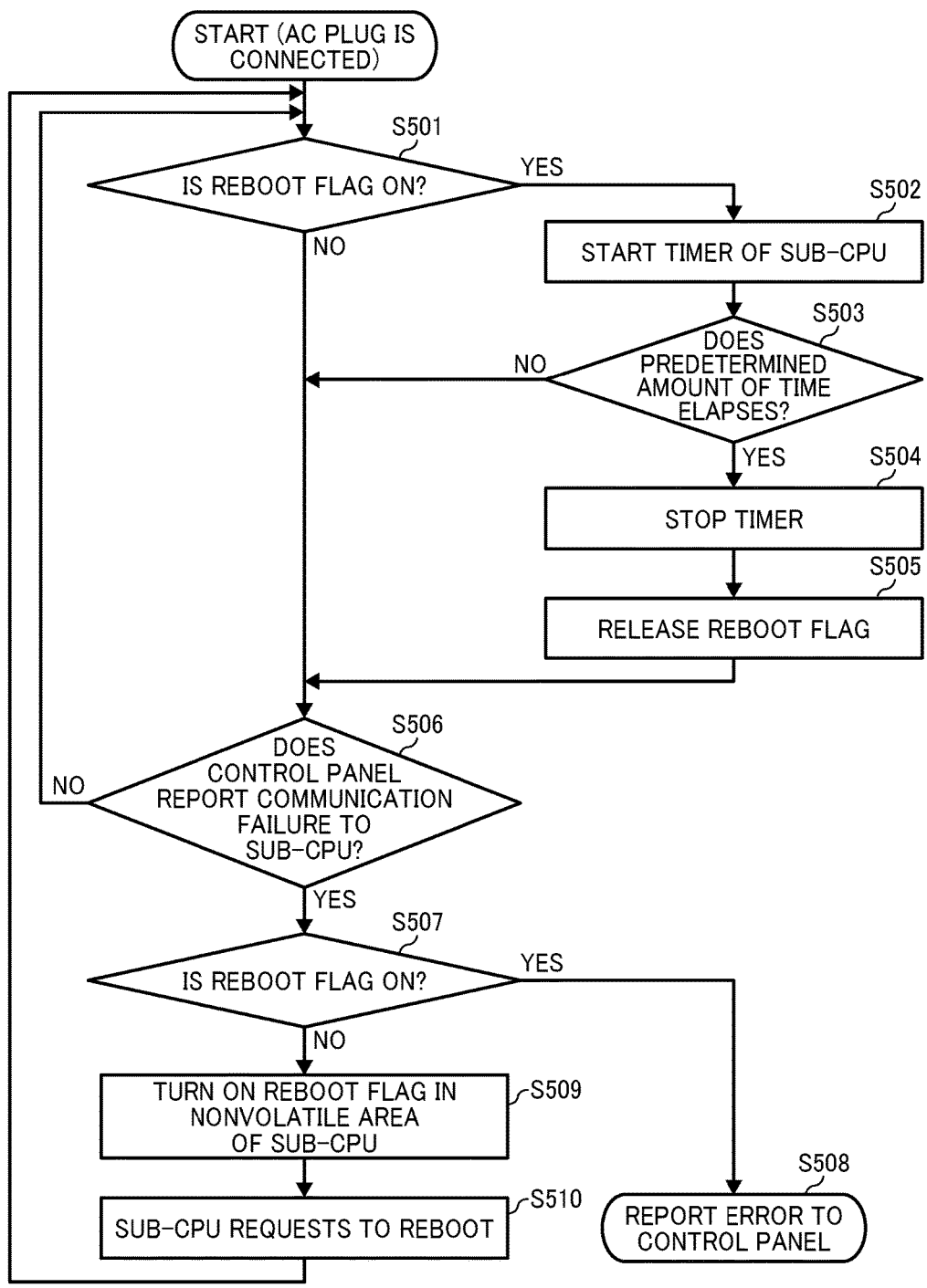
FIG. 9 is a flowchart illustrating a first operation of rebooting automatically in the reboot system as an embodiment of the present invention.

FIG. 9 is a flowchart illustrating a first operation of rebooting automatically in the reboot system in this embodiment.

In the operation, it is assumed that the sub-CPU 202 is driven using a power source supplied by inserting an AC plug. In this case, the power source of the sub-CPU 202 is not shut down while the AC plug is inserted, and it is possible to count time using the timer 202b.

Here, it is assumed that the system is rebooted for the first time in accordance with the flowchart in FIG. 9 when the communication between the controller board 20 and the control panel 21 failed. For example, a release time of the reboot flag is set to 24 hours, to create a period of time during when the system is not rebooted for 24 hours, after rebooting the system once. As a result, if errors occur frequently, it is possible to prevent from unintentional reboots.

The operation is described below with reference to the flowchart.

The sub-CPU 202 determines whether or not the reboot flag is turned on in S501.

If the reboot flag is not turned on (NO in S501), the sub-CPU 202 waits for the notification of communication failure from the control panel CPU 212 (NO in S506 to S501).

If the reboot flag is turned on (YES in S501), the sub-CPU 202 starts the timer 202b in S502. In this case, if the timer 202b has already been started, the step S502 is skipped.

After the timer starts, elapsed time is determined by checking time in S503. Subsequently, if a predetermined period of time elapses (YES in S503), the timer 202b is stopped in S504, and the reboot flag is released in S505. If the predetermined period of time does not elapse (NO in S503), elapsed time is counted waiting for the notification of communication failure from the control panel CPU 212 (NO in S506, YES in S501, to S503).

If the notification of communication failure is received from the control panel CPU 212 (YES in S506), the reboot controller 202d in the sub-CPU 202 determines an operation depending on whether or not the reboot flag is turned on. That is, if the reboot flag is turned on (YES in S507), it is determined that the predetermined period of time does not elapse after the previous reboot, and an error notification is transferred to the control panel 21 instead of performing a reboot. If the reboot flag is not turned on (NO in S507), the reboot flag in the nonvolatile area 202e of the sub-CPU 202 is turned on (S509), and the power supply circuit 203 is requested to be rebooted in S510.

Second Operation of Rebooting Automatically

Figure 10:
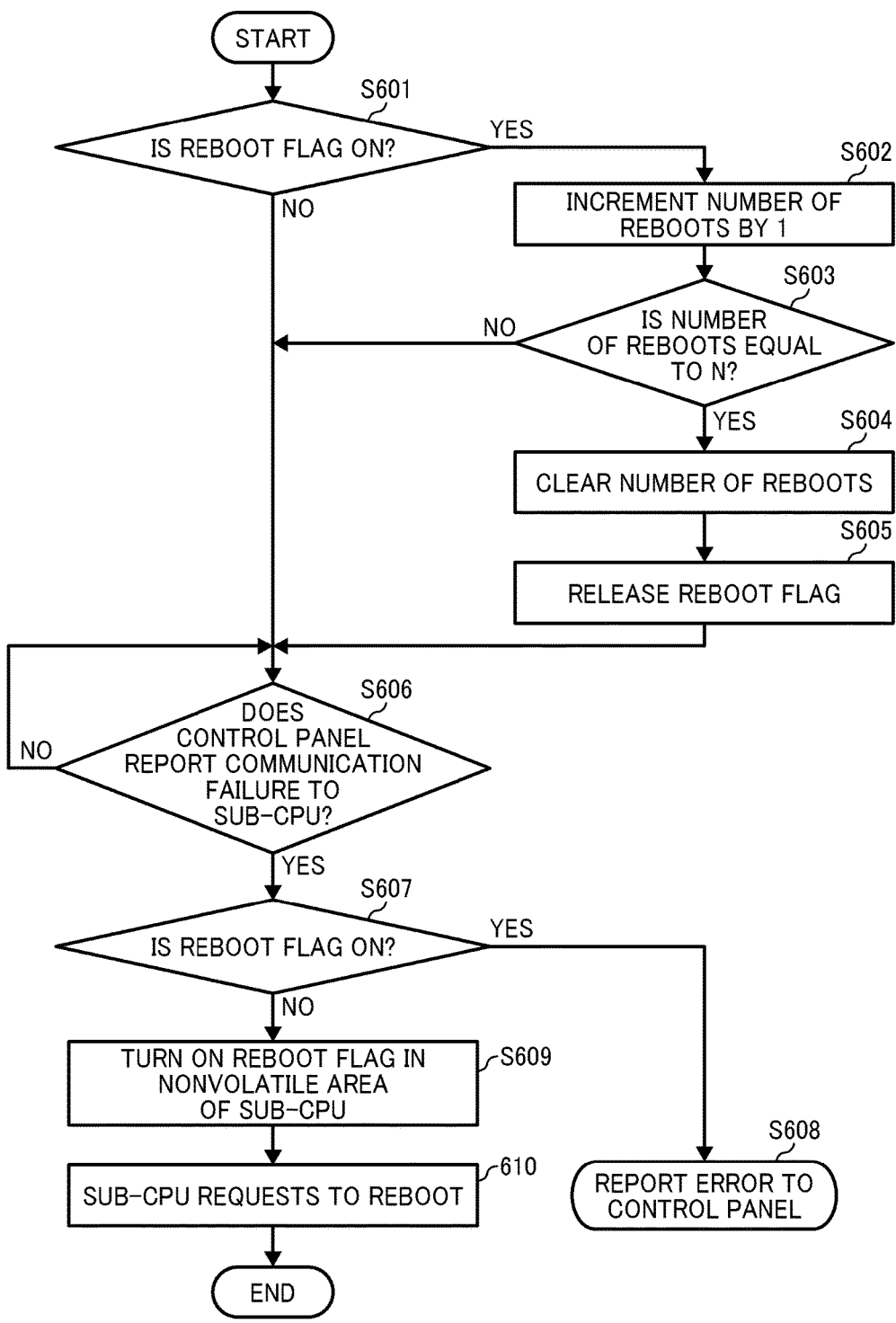
FIG. 10 is a flowchart illustrating a second operation of rebooting automatically in the reboot system as an embodiment of the present invention.

FIG. 10 is a flowchart illustrating a second operation of rebooting automatically in the reboot system in this embodiment.

In this operation, it is assumed that the sub-CPU 202 is driven by a power source supplied by inserting an AC plug or a power source that can be shut down in a shutdown state (i.e., by turning off a switch). It is possible to count the number of turning on and off a power source by monitoring the power supply circuit 203 in case of driving the system using the power source supplied by inserting the AC plug, and it is possible to count the number of turning on and off the power source by counting the number of its own startups using the counter 202c in case of driving the system using the power source that can be shut down in the shutdown state.

For example, in case of driving the system using the power source that can be shut down in the shutdown state, if it is prevented from rebooting until repeating turning off and on the power for the sub-CPU 202 for three times, it is possible to implement the configuration by turning on the reboot flag when the system is rebooted, writing the number of startups counted by the counter 202c in the number of startups memory 202g in the nonvolatile area 202e, and releasing the reboot flag after repeating startups (i.e., turning off and on the power) for three times.

The operation being driven by the power source that can be shut down in the shutdown state is described below along with the flowchart.

After turning on the power, the sub-CPU 202 first determines whether or not the reboot flag is turned on in S601. If the reboot flag is not turned on (NO in S601), the sub-CPU 202 waits for the notification of communication failure from the control panel CPU 212 in S606. When the reboot flag is turned on (YES in S601), the number of startups stored in the number of startups memory 202g in the nonvolatile area 202e is incremented by 1 in S602.

Next, it is determined whether or not the number of startups is equal to or more than a predetermined value (i.e., N in this case) in S603. If the number of startups is less than the predetermined value (NO in S603), the sub-CPU 202 waits for the notification of communication failure from the control panel CPU 212 in S606. If the number of startups is equal to or more than the predetermined value (YES in S603), the number of startups stored in the number of startups memory 202g is cleared in S604, and the reboot flag stored in the reboot flag memory 202f is released in S605.

Next, the sub-CPU 202 waits for the notification of communication failure from the control panel CPU 212 in S606. If the notification of communication failure is received from the control panel CPU 212 (YES in S606), the operation is determined depending on whether or not the reboot flag is turned on in S607. That is, if the reboot flag is turned on (YES in S607), an error notification is transferred to the control panel CPU 212 instead of performing a reboot in S608. If the reboot flag is not turned on (NO in S607), the reboot flag is turned on in S609, and the power supply circuit 203 is requested to be rebooted in S610. In response to the request to reboot the system, the power source for the sub-CPU 202 is shut down by the power source circuit 203 and turned on again.

Third Operation of Rebooting Automatically

Figure 11:
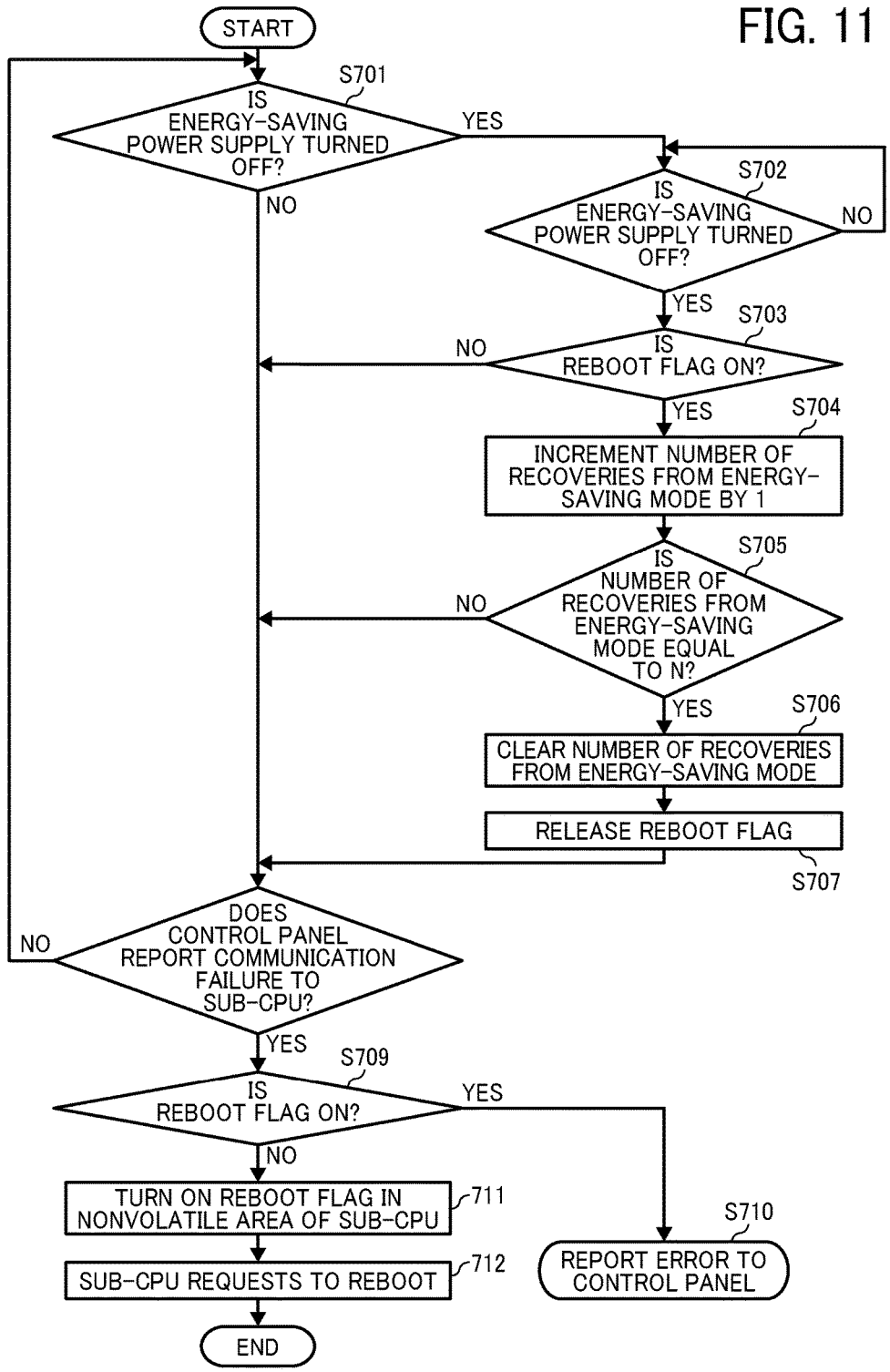
FIG. 11 is a flowchart illustrating a third operation of rebooting automatically in the reboot system as an embodiment of the present invention.

FIG. 11 is a flowchart illustrating a third operation of rebooting automatically in the reboot system in this embodiment.

In this operation, it is assumed that the sub-CPU 202 is driven by a power source supplied by inserting an AC plug, a power source that can be shut down in a shutdown state, or a power source that can be shut down in the energy-saving mode. For example, a period of time may be set during when rebooting is prohibited if the number of recoveries from energy-saving mode is equal to or less than a predetermined number of times by monitoring the power supply circuit 203, in case of driving the system using the power source supplied by inserting the AC plug. In another example, a period of time may be set during when rebooting is prohibited if the number of recoveries from energy-saving mode is equal to or less than a predetermined number of times by counting the number of times of turning off and on the power in case of driving the system using the power source that can be shut down in the energy-saving mode.

The operation being driven by the power source that can be shut down in the shutdown state is described below along with the flowchart.

The sub-CPU 202 monitors the power source circuit 203 and determines whether or not the power source that is shut down in the energy-saving mode (hereinafter referred to as "energy-saving power source") is turned off in S701. If the energy-saving power source is turned on (NO in S701), the sub-CPU 202 waits for the notification of communication failure from the control panel CPU 212 in S708, and steps S701 to S708 are repeated until the system transitions to the energy-saving mode.

If the energy-saving power source is turned off (YES in S701), the sub-CPU 202 waits until the energy-saving power source is turned on in S702. After the energy-saving power source is turned on (YES in S702), the sub-CPU 202 checks whether or not the reboot flag is turned on in S703.

If the reboot flag is not turned on (NO in S703), the sub-CPU 202 waits for the notification of communication failure from the control panel CPU 212 in S708, and steps S701 to S708 are repeated until the system transitions to the energy-saving mode.

If the reboot flag is turned on (YES in S703), the sub-CPU 202 increments the number of recoveries from energy-saving mode, stored in the recovery number memory 202h, by 1 in S704, and determines whether or not the number of recoveries from energy-saving mode is equal to or more than a predetermined value (i.e., N in this case) in S705.

If the number of recoveries from energy-saving mode is less than the predetermined value (NO in S705), the sub-CPU 202 waits for the notification of communication failure from the control panel CPU 212 in S708, and steps S701 to S708 are repeated until the system transitions to the energy-saving mode.

If the number of recoveries from energy-saving mode is equal to or more than the predetermined value (YES in S705), the number of recoveries from energy-saving mode, stored in the recovery number memory 202h, is cleared in S706, and the reboot flag stored in the reboot flag memory 202f is released in S707. Subsequently, the sub-CPU 202 waits for the notification of communication failure from the control panel CPU 212 in S708, and steps S701 to S708 are repeated until the system transitions to the energy-saving mode.

If the notification of communication failure is received from the control panel CPU 212 (YES in S708), the operation is determined depending on whether or not the reboot flag is turned on in S709. That is, if the reboot flag is turned on (YES in S709), an error notification is transferred to the control panel CPU 212 instead of performing a reboot in S710. If the reboot flag is not turned on (NO in S709), the reboot flag is turned on in S711, and the power supply circuit 203 is requested to be rebooted in S712. In response to the request to reboot the system, the power source for the sub-CPU 202 is shut down by the power source circuit 203 and turned on again.

Fourth Operation of Rebooting Automatically

In the first operation of rebooting automatically described above, the power source for the sub-CPU 202 is turned on while the AC plug is inserted, and the power consumption becomes high. In the second operation of rebooting automatically described above, it is difficult to reduce the power consumption. In addition, if a user who does not shut down the system exists, after once rebooting the system, the system may not be rebooted after that. In the third operation of rebooting automatically described above, the system may not support a user who does not use the energy-saving mode.

Therefore, in the fourth operation of rebooting automatically, to cope with these issues, the first operation of rebooting automatically, the second operation of rebooting automatically, and the third operation of rebooting automatically are combined. In this operation, it is assumed that the sub-CPU 202 is driven by the power source supplied by inserting the AC plug, the power source that can be shut down in the shutdown state, or the energy-saving power source.

Figure 12B:
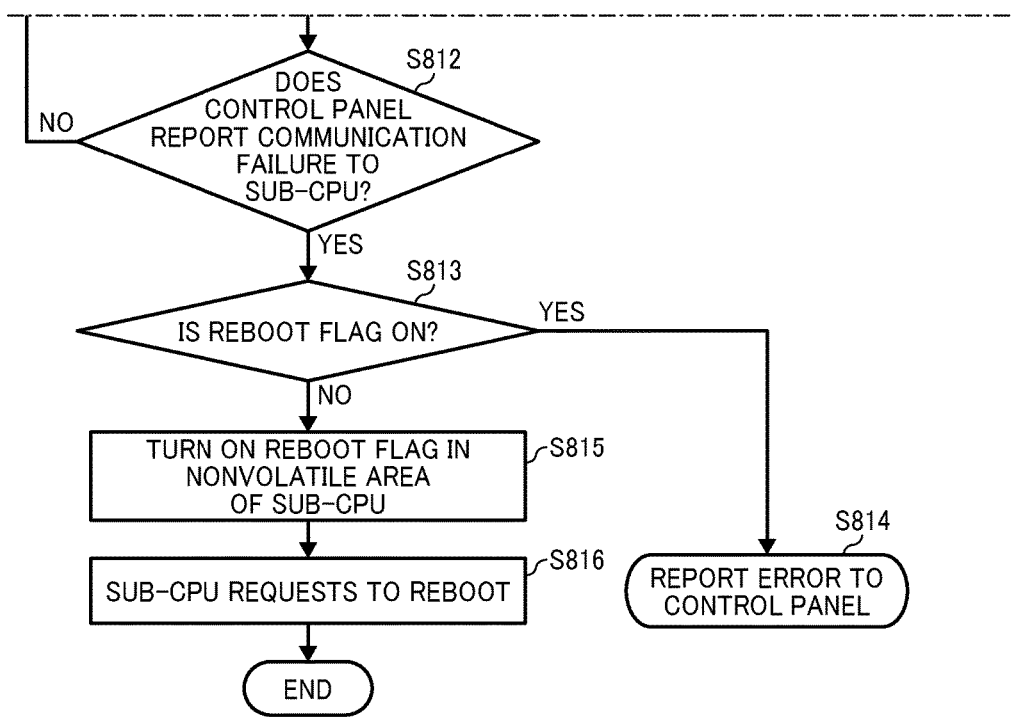

FIGS. 12A and 12B are flowcharts illustrating a fourth operation of rebooting automatically in the reboot system in this embodiment.

For example, in case of driving the system using the energy-saving power source, the sub-CPU 202 counts its own number of startups and a time period. In this case, it is assumed the number of startups is 10 and the period of time is 24 hours when the system may not be rebooted, and the system may not be rebooted sequentially until either one of the two conditions is satisfied. In this mechanism, for example, cases (i) and (ii) described below are assumed.

(i) Case when a user uses the energy-saving mode and shutdown

The sub-CPU 202 counts its own number of times of turning off and on the power using the counter 202c, and it is prevented from rebooting until the number of startups reaches 10.

(ii) Case when a user does not use the energy-saving mode and shutdown

The sub-CPU 202 counts time using the timer 202b, and it is prevented from rebooting until 24 hours elapses.

The operation being driven by the energy-saving power source is described below along with the flowchart.

After turning on the power, the sub-CPU 202 first determines whether or not the reboot flag is turned on in S801. If the reboot flag is not turned on (NO in S801), the sub-CPU 202 waits for the notification of communication failure from the control panel CPU 212 (NO in S806 to S812).

When the reboot flag is turned on (YES in S601), the number of startups, stored in the startup number memory 202g in the nonvolatile area 202e, is incremented by 1 in S802, and it is determined whether or not the number of startups is equal to or larger than a predetermined value (i.e., N in this case) in S803.

If the number of startups is equal to or larger than the predetermined value (YES in S803), the number of startups are cleared in S804, and the reboot flag is released in S805. Next, the sub-CPU 202 waits for the notification of communication failure from the control panel CPU 212 (NO in S806 to S812).

If the number of startups is less than the predetermined value (NO in S803), the sub-CPU 202 starts the timer 202b in S807. In this case, if the timer 202b has already been started, the step S807 is skipped. After the timer starts, elapsed time is determined by checking time in S808.

Next, if the predetermined period of time elapses (YES in S808), the timer is stopped in S809, the number of startups is cleared in S810, and the reboot flag is released in S811. Subsequently, the sub-CPU 202 waits for the notification of communication failure from the control panel CPU 212 in S812.

If the predetermined period of time does not elapse (NO in S808), elapsed time is counted waiting for the notification of communication failure from the control panel CPU 212 (NO in S812, S806, to S808). If the notification of communication failure is received from the control panel CPU 212 (YES in S812), the operation is determined depending on whether or not the reboot flag is turned on. That is, if the reboot flag is turned on (YES in S813), an error notification is transferred to the control panel CPU 212 instead of performing a reboot in S814. If the reboot flag is not turned on (NO in S813), the reboot flag is turned on in S815, and the power supply circuit 203 is requested to be rebooted in S816. In response to the request to reboot the system, the power source for the sub-CPU 202 is shut down by the power source circuit 203 and turned on again.

Figure 13:
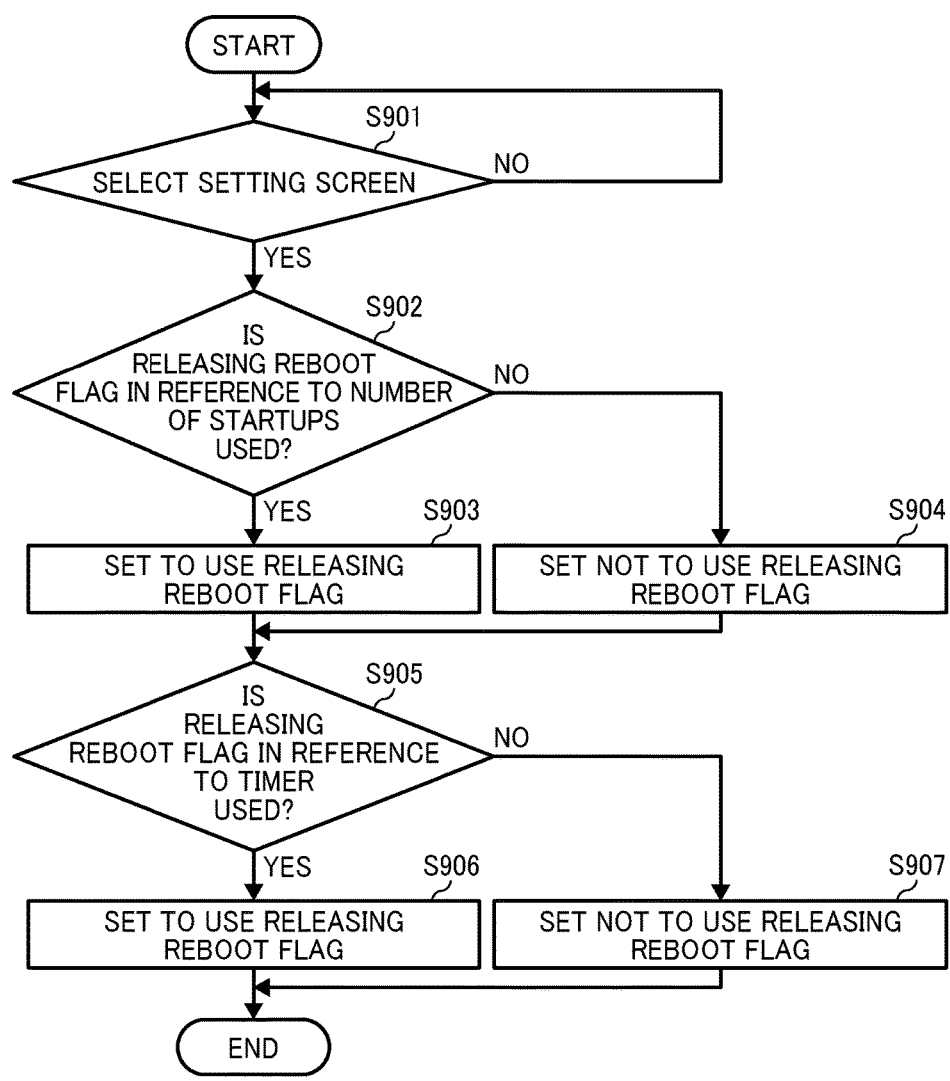
FIG. 13 is a flowchart illustrating a first operation of selectively performing the first operation of rebooting automatically and the second operation of rebooting automatically in the reboot system as an embodiment of the present invention.

First configuration of the first operation of rebooting automatically and the second operation of rebooting automatically FIG. 13 is a flowchart illustrating a first operation of determining whether or not the first operation of rebooting automatically and the second operation of rebooting automatically are performed, according to an embodiment.

After selecting a setting information input screen (hereinafter referred to as a setting screen) on the operation panel 211 by user operation (YES in S901), a setting screen is generated by the setting information input screen generator 212c in the control panel CPU 212 and displayed on the operation panel 211. The setting information acquisition unit 212d in the control panel CPU 212 determines whether or not it is selected to use releasing the reboot flag depending on the number of startups on the setting screen by user operation in S902.

If it is selected to use releasing the reboot flag depending on the number of startups by user operation (YES in S902), the configuration is set to "YES" in S903. If it is not selected to use releasing the reboot flag depending on the number of startups by user operation (NO in S902), the configuration is set to "NO" in S904.

Next, the setting information acquisition unit 212d determines whether or not it is selected to use releasing the reboot flag depending on the timer on the setting screen by user operation in S905. If it is selected to use releasing the reboot flag depending on the timer by user operation (YES in S905), the configuration is set to "YES" in S906. If it is not selected to use releasing the reboot flag depending on the timer by user operation (NO in S905), the configuration is set to "NO" in S907.

The setting information described above is acquired by the setting information acquisition unit 212d, reported to the sub-CPU 202 in the controller board 20 by the notification unit 212b, and reflected to the operation of the controller board 20.

Figure 14:
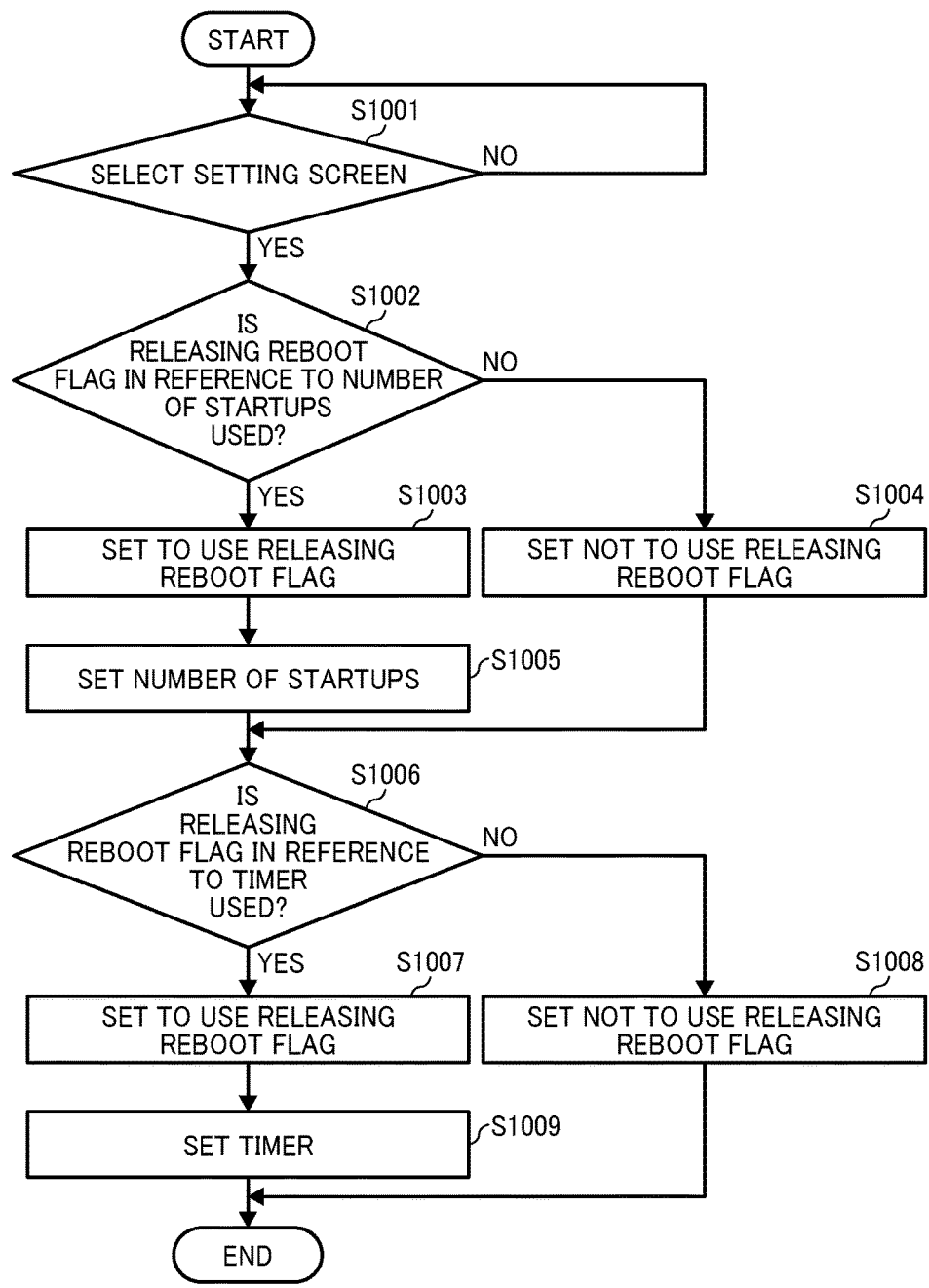
FIG. 14 is a flowchart illustrating a second operation of selectively performing the first operation of rebooting automatically and the second operation of rebooting automatically in the reboot system as an embodiment of the present invention.

Second configuration of the first operation of rebooting automatically and the second operation of rebooting automatically FIG. 14 is a flowchart illustrating a second operation of determining whether or not the first operation of rebooting automatically and the second operation of rebooting automatically are performed, according to an embodiment.

After selecting the setting screen on the operation panel 211 by user operation (YES in S1001), the setting screen is generated by the setting information input screen generator 212c and displayed on the operation panel 211. The setting information acquisition unit 212d in the control panel CPU 212 determines whether or not it is selected to use releasing the reboot flag depending on the number of startups on the setting screen by user operation in S1002.

If it is selected to use releasing the reboot flag depending on the number of startups by user operation (YES in S1002), the configuration is set to "YES" in S1003. If it is not selected to use releasing the reboot flag depending on the timer by user operation (NO in S1002), the configuration is set to "NO" in S1004. If the step S1003 is performed, an input value of the number of releasing flag input on the setting screen is configured in S1005.

After performing the step S1004 and the step S1005, the setting information acquisition unit 212d determines whether or not it is selected to use releasing the reboot flag depending on the timer on the setting screen by user operation in S1006. If it is selected to use releasing the reboot flag depending on the timer by user operation (YES in S1006), the configuration is set to "YES" in S1007. If it is not selected to use releasing the reboot flag depending on the timer by user operation (NO in S1006), the configuration is set to "NO" in S1008. If the step S1007 is performed, an input value of time for releasing flag is configured in S1009

The setting information described above is acquired by the setting information acquisition unit 212d, reported to the sub-CPU 202 in the controller board 20 by the notification unit 212b, and reflected to the operation of the controller board 20. As a result, the operations illustrated in FIG. 13 or 14 allow a user to freely customize unnecessary functions. That is, for example, it is possible to customize the system that does not use the timer since the system uses the energy-saving mode for example. In addition, a customer engineer may appropriately customize the setting in accordance with an application of the system at user's site. That is, for example, regarding a user who uses the energy-saving mode and shuts down the system at the end of workdays, by stopping counting time, it is possible to prevent from unnecessary reboots.

In the above description, it is assumed that the reboot system in this embodiment may perform all operations from the first operation of rebooting automatically to the fourth operation of rebooting automatically (FIGS. 9 to 12), or select to perform more than one of the operations by user operation. However, it is possible to implement any one, any two, or any three of the four operations of rebooting automatically and select more than one operation of rebooting automatically by user operation.

The embodiments described above provide the reboot system that reboots automatically if communication failure between the control panel of the apparatus and the controller of the apparatus occurs, to reduce user workload and service cost.

The present invention also encompasses a non-transitory recording medium storing a program that executes a method of rebooting a reboot system including a main controller that communicates with a control panel controller to control an apparatus, and a sub-controller that controls a power supply of the apparatus. The method includes steps of monitoring, with the control panel controller, communication between the main controller and the control panel controller to detect a communication failure, sending a notification from the control panel controller to the sub-controller, the notification indicating the communication failure between the main controller and the control panel controller, and requesting, with the sub-controller, the power supply to reboot the reboot system when the notification from the control panel controller indicating the communication failure is received.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reboot system, comprising:
   a control panel to operate an apparatus, the control panel including a control panel control circuit;
   a main control circuit to communicate with the control panel control circuit of the control panel to control the apparatus; and
   a sub-control circuit to control a power supply of the apparatus,
   wherein the control panel control circuit is configured to monitor communication between the main control circuit and the control panel control circuit to detect a communication failure, and is configured to notify the sub-control circuit of the communication failure, upon detection, between the main control circuit and the control panel control circuit, and
   wherein the sub-control circuit is configured to request the power supply to reboot in response to notification from the control panel control circuit indicating the communication failure being received
   wherein the sub-control circuit is further configured to count a number of reboots performed in response to the requesting of the power supply to reboot, and
   wherein the sub-control circuit is further configured to send, in response to the number of reboots counted being equal to or larger than a threshold number of times, an error message for display.

2. The reboot system of claim 1,
   wherein the sub-control circuit is configured to monitor a communication between the main control circuit and a memory connected to the main control circuit and is configured to make the request to reboot the power supply, upon the notification from the control panel control circuit indicating the communication failure being received and in response to monitoring by the sub-control circuit indicating no communication between the main control circuit and the memory due to the communication failure.

3. The reboot system of claim 2,
wherein the sub-control circuit is configured to control stopping of communication between the main control circuit and the memory, upon the notification from the control panel control circuit indicating the communication failure being received and in response to monitoring by the sub-control circuit indicating communication between the main control circuit and the memory.

4. The reboot system of claim 3,
wherein the sub-control circuit is configured to stop the communication between the main control circuit and the memory, upon the notification from the control panel control circuit indicating the communication failure being received, in response to monitoring by the sub-control circuit indicating communication between the main control circuit and the memory continuing for a threshold period of time, and in response to a control signal, output from the main control circuit to the memory, being asserted.

5. The reboot system of claim 3,
wherein the sub-control circuit is configured to mask a control signal output from the main control circuit to the memory to stop the communication between the main control circuit and the memory, in response to monitoring by the sub-control circuit indicating communication between the main control circuit and the memory continuing for a threshold period of time.

6. The reboot system of claim 1,
wherein the sub-control circuit is configured to not request the power supply to reboot until a threshold period of time elapses after the power supply has rebooted in response to the request to reboot, even in response to the notification of the communication failure between the main control circuit and the control panel control circuit.

7. The reboot system of claim 6,
wherein the threshold period of time elapses upon a number of startup times of the power supply becoming a threshold number of times.

8. The reboot system of claim 6,
wherein the threshold period of time elapses upon a number of times that the power supply is turned on after recovering from an energy-saving mode becoming a threshold number of times.

9. A method of rebooting a reboot system, the rebooting system including a main control circuit to communicate with a control panel control circuit to control an apparatus, and a sub-control circuit to control a power supply of the apparatus, the method comprising:
monitoring, via the control panel control circuit, communication between the main control circuit and the control panel control circuit to detect a communication failure;
sending a notification from the control panel control circuit to the sub-control circuit, upon the monitoring indicating a detection of the communication failure, the notification indicating the communication failure between the main control circuit and the control panel control circuit;
requesting, via the sub-control circuit, the power supply to reboot the reboot system in response to the notification from the control panel control circuit indicating the communication failure being received;
counting, via the sub-control circuit, a number of reboots performed in response to the requesting of the power supply to reboot; and
sending, via the sub-control circuit and in response to the number of reboots counted being equal to or larger than a threshold number of times, an error message for display.

10. The method of rebooting of claim 9, further comprising:
monitoring, via the sub-control circuit, for communication between the main control circuit and a memory connected to the main control circuit; wherein the requesting includes requesting, via the sub-control circuit, the power supply to reboot upon the notification from the control panel control circuit indicating the communication failure being sent and in response to the monitoring indicating no communication being detected between the main control circuit and the memory due to the communication failure.

11. The method of rebooting of claim 10, further comprising:
stopping, via the sub-control circuit, communication between the main control circuit and the memory, upon the notification from the control panel control circuit indicating the communication failure being sent and in response to the monitoring indicating the communication between the main control circuit and the memory.

12. The method of rebooting of claim 11, further comprising:
stopping, via the sub-control circuit, the communication between the main control circuit and the memory, upon the notification from the control panel control circuit indicating the communication failure being sent, in response to the monitoring indicating communication between the main control circuit and the memory continuing for a threshold period of time and in response to a control signal, output from the main control circuit to the memory, being asserted.

13. The method of rebooting of claim 11, wherein the stopping includes masking, via the sub-control circuit, a control signal output from the main control circuit to the memory to stop the communication between the main control circuit and the memory, in response to the monitoring indicating communication between the main control circuit and the memory continuing for a threshold period of time.

14. The method of rebooting of claim 9,
wherein the requesting of the power supply to reboot is not performed until a threshold period of time elapses after the power supply has rebooted in response to the request to reboot, even in response to notification of the communication failure between the main control circuit and the control panel control circuit.

15. The method of rebooting of claim 14, wherein the threshold period of time elapses upon a number of startup times of the power supply becoming a threshold number of times.

16. A method of rebooting a reboot system, the rebooting system including a main control circuit to communicate with a control panel control circuit to control an apparatus, and a sub-control circuit to control a power supply of the apparatus, the method comprising:

monitoring, via the control panel control circuit, communication between the main control circuit and the control panel control circuit to detect a communication failure:

sending a notification from the control panel control circuit to the sub-control circuit, upon the monitoring indicating a detection of the communication failure, the notification indicating the communication failure between the main control circuit and the control panel control circuit; and requesting, via the sub-control circuit, the power supply to reboot the reboot system in response to the notification from the control panel control circuit indicating the communication failure being received, wherein the requesting of the power supply to reboot is not performed until a threshold period of time elapses after the power supply has rebooted in response to the request to reboot, even in response to notification of the communication failure between the main control circuit and the control panel control circuit, and wherein the threshold period of time elapses upon a number of times that the power supply is turned on after recovering from an energy-saving mode becoming a threshold number of times.

\* \* \* \* \*